Figure 1:
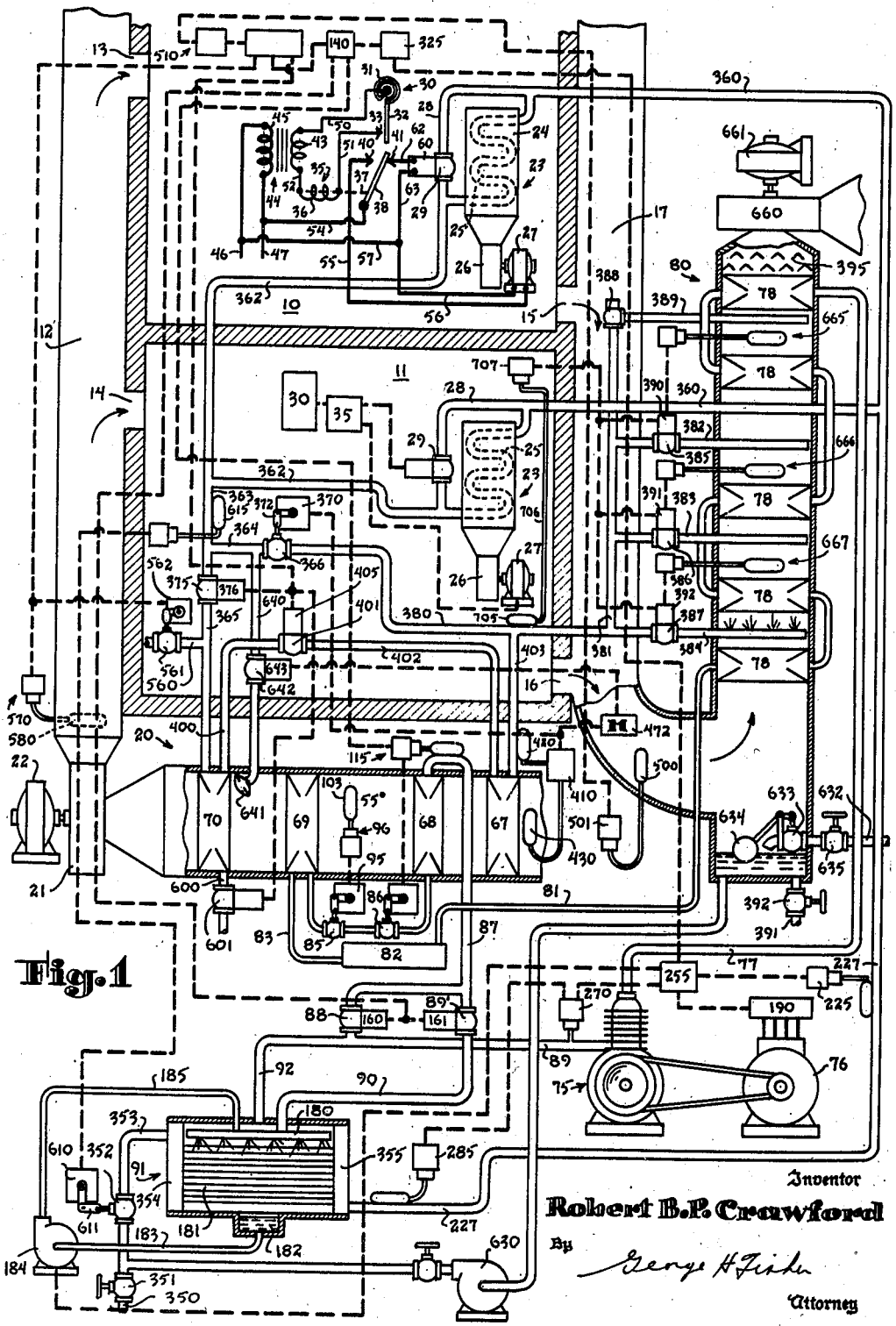

Dec. 8, 1942.        R. B. P. CRAWFORD        2,304,243
AIR CONDITIONING SYSTEM
Filed March 3, 1939        2 Sheets-Sheet 1

Inventor
Robert B. P. Crawford
By George H. Fisher
Attorney

Dec. 8, 1942.   R. B. P. CRAWFORD   2,304,243
AIR CONDITIONING SYSTEM
Filed March 3, 1939   2 Sheets-Sheet 2

Inventor
Robert B. P. Crawford
By George H. Fisher
Attorney

Patented Dec. 8, 1942

2,304,243

UNITED STATES PATENT OFFICE 2,304,243

AIR CONDITIONING SYSTEM

Robert B. P. Crawford, Miami, Fla.

Application March 3, 1939, Serial No. 259,562

25 Claims. (Cl. 257—3)

This invention relates to an air conditioning system and more particularly to a system for controlling temperature and humidity conditions within a building.

This system is particularly applicable where it is desired to install an air conditioning system in a building that was originally built without any thought of installing such a system therein and wherein it is not desirable or feasible to install a large amount of duct work throughout the building for the purpose of conditioning the same.

In order to accurately control temperature and humidity conditions within the building with the use of a minimum amount of duct work therein, in accordance with the teachings of my invention, fresh air is drawn through a conditioning chamber and this air is dehumidified to the desired value, and the air leaving the chamber may also have a lower dry bulb temperature than the incoming air, but at the same time the temperature thereof may not be sufficiently low to reduce the space temperatures to the desired value. This air, the humidity of which has been reduced to the desired value, may be supplied to the corridors, stairways, etc., throughout the building and supplied proportionately on each level so that it can reach the various rooms to be conditioned by way of transoms, grills, or other channels, and in this manner the air may be distributed throughout the building without the absolute necessity of a complicated system of duct work. The air accordingly enters the various rooms within the building at the proper humidity, but not necessarily at a low enough temperature. In order to control the temperature of the air in the various spaces, unit coolers may be provided and operated in accordance with the temperature in the respective spaces to properly control the temperature of the various spaces. The air will leak out ordinarily through windows and exhaust vents.

The temperature of the various spaces may be reduced by circulating a cooling fluid such as water through unit coolers located in the various spaces to be conditioned, and circulating the air in the various spaces through the unit coolers as long as the temperature in the respective spaces is above the desired value. Suitable refrigerating apparatus is employed for reducing the temperature and humidity of the air passing through the air conditioning chamber, and this same apparatus is employed for reducing the temperature of the fluid being circulated through the unit coolers, if necessary. This cooling fluid is preferably passed through the system only once and is obtained from a suitable source such as a subterranean source, if available, so that its temperature is relatively low and where a great deal of cooling of the spaces is unnecessary, it may be unnecessary to further cool this fluid by the refrigerating apparatus.

The air which is exhausted from the spaces is relatively cool and dry and is passed over the condenser of the refrigerating apparatus to lower the temperature and pressure of the refrigerant therein. The water which has circulated through the unit coolers is also sprayed into the stream of air passing over the condenser to additionally cool the condenser, and the point at which the water is added to the air passing over the condenser is controlled in a manner to produce a maximum cooling effect thereof as will be clearly understood upon a study of the specification.

The water, after leaving the unit coolers, and prior to its discharge into the stream of air passing over the condenser, is utilized for reheating and precooling the air passing through the air conditioning chamber, the water first passing through a reheat coil for raising the temperature of the air which has had its dew-point decreased in the air conditioning chamber, and this water is then passed through a precooling coil to precool the air entering the chamber, the water flowing through these coils being controlled so that the temperature of the water leaving the precooling coil will be just slightly below the temperature of the air entering the air conditioning chamber. The air leaving the dehumidifying coil, which forms the evaporator coil of the refrigeration system, is tempered by passing over a coil through which the refrigerant flows before entering the evaporator, whereby the refrigerant is precooled and the load on the refrigeration system is reduced. By reason of the novel heat exchange relationships and the control arrangements, it is possible to condition a large building with the use of a refrigeration system of small capacity where a suitable water supply having a relatively low temperature is readily obtainable at low cost, this being done with the use of a minimum amount of duct work in the building.

It is therefore an object of my invention to provide an air conditioning system of the type set forth above.

A further object of the invention is the provision of a novel control system for an air conditioning system.

Another object of the invention is the provision of a novel arrangement for cooling the condenser of a refrigeration system.

More specifically it is an object of my invention to provide a central dehumidifying means for reducing the humidity of the air in a building to a desired value, cooling means in each of the spaces in the building which are to be conditioned, means controlling each of the cooling means according to the temperatures of the respective spaces, and a single refrigeration system for operating both the dehumidfying means and the various cooling means in a novel manner.

Figure 2:
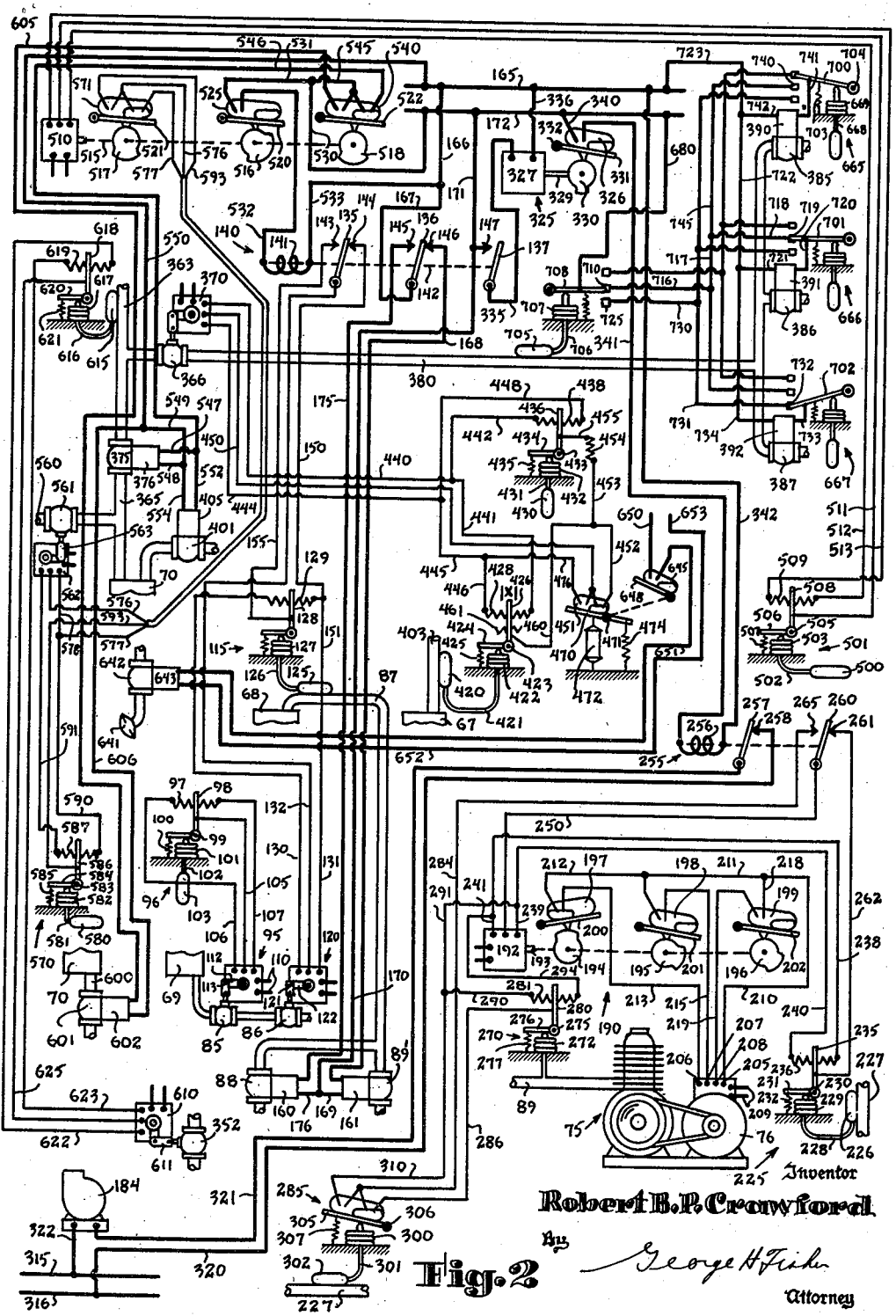

Other objects and advantages will become apparent upon a study of the specification, claims, and appended drawings wherein like reference characters represent like parts in the two views and wherein Figure 1 is a diagrammatic view of one form of air conditioning system embodying my invention, and Figure 2 is a view illustrating in detail the wiring of Figure 1.

Referring more particularly to Figure 1, reference characters 10 and 11 illustrate two spaces or rooms within a building to be conditioned. It should be understood that my invention is applicable for air conditioning any desired number of rooms but for purposes of illustration only two such rooms have been shown. Air is admitted into the spaces 10 and 11 by any suitable means such as corridors, stairways, etc., but merely for purposes of illustration, I have illustrated a duct 12 having outlets 13 and 14, the air leaving the rooms by means of openings 15 and 16 which may communicate with an outlet duct 17.

The air entering the spaces by means of the duct 12 is first conditioned by means of a conditioning chamber illustrated generally by the reference character 20, the air being drawn through this chamber by means of a fan or blower 21 driven by a motor 22. The air in the various spaces is further conditioned according to the individual requirements of each space by means of the unit air conditioners 23. These conditioners may comprise a conditioning chamber 24 provided with a cooling coil 25, the air being circulated through the chamber 24 by means of the fan 26 driven by a motor 27. Cooling fluid is circulated through the coil 25 or may be bypassed around this coil by means of the pipe 28, the flow of fluid through the by-pass being controlled by a valve 29. When the valve 29 is closed all the cooling fluid flowing to the room must pass through the cooling coil 25 but when the valve 29 is opened the cooling fluid is permitted to by-pass the coil 25 to effectively reduce the cooling effect thereof.

The individual cooling units for each of the spaces are controlled by room thermostats 30. These thermostats may be of any suitable construction and are illustrated as comprising a bimetallic element 31 carrying an arm 32 for cooperation with a fixed contact 33. Upon a rise in temperature in the space the arm 32 is moved into engagement with the fixed contact 33 and causes the energization of a relay 35. This relay may comprise a relay coil 36 having an armature 37 to which is connected a switch arm 38 which cooperates with fixed contacts 40 and 41. When the relay is deenergized the arm 38 is held in engagement with the fixed contact 41 under the influence of gravity or by means of any suitable biasing means (not shown). Upon energization of the relay 35 the arm 38 moves into engagement with the fixed contact 40. Power may be supplied to the relay 35 by means of the low tension secondary 43 of the transformer 44. This transformer also includes a high tension primary 45 connected across the lines 46 and 47 which are connected to a suitable source of power (not shown).

Upon a rise in temperature in the space to a predetermined value and engagement of arm 32 of the thermostat 30 with the fixed contact 33, relay 35 is energized by the following circuit: from the secondary 43 of transformer 44 through conductor 50, the thermostat 30, fixed contact 33, conductor 51, relay coil 36 and conductor 52 to the other side of the transformer 43. Energization of the relay coil 36 causes arm 38 to move into engagement with the fixed contact 40 whereupon the motor 27 driving the fan 26 of the unit conditioner is energized as follows: from the line 47 through conductor 54, relay arm 38, fixed contact 40, conductor 55, motor 27, and conductors 56 and 57 to the line wire 46. The position of valve 29 may be controlled by a solenoid 60, energization of this solenoid opening the valve 29, the valve closing under the influence of gravity or a suitable biasing means upon deenergization of the solenoid 60. When the relay arm 38 moves into engagement with the contact 40 the circuit to the solenoid 60 is broken and the valve 29 is closed so that all of the cooling fluid flows through the unit conditioner coil 25. When, however, the temperature in the room drops to a predetermined value the relay 35 is deenergized by reason of the opening of the circuit thereto at the contact 33. Movement of the arm 38 into engagement with the fixed contact 41 causes the solenoid 60 to be energized as follows: from the line wire 47 through conductor 54, relay arm 38, contact 41, conductor 62, solenoid 60, and conductors 63 and 57 to the line wire 46. At the same time the circuit to the fan motor 27 is interrupted so that operation of the fan stops. It will now be apparent that when the thermostat in any of the spaces is calling for cooling the by-pass valve 29 is closed and the fan motor is energized to effect a further reduction in the temperature of the room by the unit conditioner 23. When the room thermostat is satisfied by reason of a desired reduction in the temperature the operation of the fan is stopped and the cooling fluid is allowed to circulate through the by-pass 28 by reason of the opening of the valve 29. In this manner the temperature of the air in the various spaces may be individually controlled.

The air entering the various spaces to be conditioned as by means of the duct 12 is first conditioned in the chamber 20 by a suitable reduction in the wet and dry bulb temperature thereof during the cooling season by means to be hereinafter described. Located within the chamber 20 are heat exchanger coils 67, 68, 69, and 70. The coil 67 forms a precooling coil for the fresh air entering the chamber 20 by means of the inlet located at the right end of the chamber. The air is further cooled by means of the coil 68 which forms the evaporator of a refrigeration system to be described, the air being cooled by this coil in a manner to properly dehumidify the air whereupon the air is reheated by the coil 69 which also forms a part of the refrigeration system and the air is further reheated by the coil 70.

Referring now to the refrigeration system forming a part of this air conditioning system, a compressor 75 driven by a multi-speed motor 76 is provided. Refrigerant leaves the compressor by means of the pipe 77 whence it flows to a plurality of coils 78 arranged in series in a suitable heat dissipating tower 80. The refrigerant flowing through the coils 78 is suitably cooled in a manner to be described, these coils forming the condenser of the refrigeration system and the refrigerant then flows by means of pipe 81 to a receiver 82. The refrigerant leaving the receiver 82 by means of the pipe 83 flows through the coil 69 in which the temperature of the refrigerant is further reduced and the air passing over this coil has its temperature raised thereby and the refrigerant then flows to the evaporator 68 under the control of the expansion valves 85 and 86. The refrigerant leaving the evaporator 68 flows by means of the pipe 87, valve 88, and pipe 89 directly to the compressor or by means of the valve 89', pipe 90, the heat exchanger 91 and pipes 92 and 89 to the inlet of the compressor depending upon the positions of the valves 88 and 89' as will be hereinafter described.

The expansion valve 85 is operated by means of a motor 95, this motor in turn being controlled by the temperature of the air leaving the coil 68 in a manner to maintain this temperature at a 55° saturation temperature. For this purpose a temperature responsive device 96 is positioned in the path of air flow to the chamber. This controller is shown to comprise a potentiometer including a resistance 97 and a cooperating wiper arm 98 pivoted at 99 and biased by means of a spring 100 into engagement with a bellows 101. This bellows is connected by means of a capillary tube 102 to a bulb 103, the tube, bulb, and bellows being provided with a suitable volatile fill wherein expansion and contraction of the bellows 101 takes place in response to variations in temperature of the air passing over the bulb 103. The motor 95 may be a proportioning motor of the type illustrated in Patent 2,028,110, issued to D. G. Taylor January 14, 1936. This motor is connected by means of the conductor 105 with the wiper arm 98 and by means of the conductors 106 and 107 with the extremities of the potentiometer resistance 97. Power may be supplied to the motor by means of wires 110 connected to a suitable source of power (not shown). As will be understood upon reference to the above mentioned Taylor patent the arm 112 driven by the motor 95 will assume positions corresponding to the position of the arm 98 with respect to the resistance 97. The arm 112 of the motor 95 is suitably connected by means of the link 113 with the stem of valve 85 and as the temperature of the air passing over the bulb 103 rises and the arm 98 is shifted toward the right the arm 112 operated by the motor 95 will move in a clockwise direction a corresponding amount thus opening the valve 85 by an amount proportional to the rise in temperature of the air passing over the bulb 103. Accordingly as the air passing over this bulb increases in temperature the valve 85 tends to permit an increase in the flow of refrigerant to the evaporator 68 whereas upon a drop in temperature the valve 85 will move towards closed position thus reducing the amount of refrigerant flowing to the evaporator.

The valve 85 will normally maintain the evaporator 68 in a flooded condition as long as the flow of refrigerant to the evaporator is not restricted by the expansion valve 86 which is connected in series with the valve 85. The expansion valve 86 is a thermostatic type of expansion valve and the position of this valve is controlled by the temperature of the refrigerant leaving the evaporator by means of the controller 115. When the cooling load on the system is high this expansion valve is maintained in a wide open position but as the cooling load decreases to a certain value the expansion valve 86 will be controlled by the controller 115 in a manner to maintain the temperature of the refrigerant leaving the evaporator 68 at a certain value at which time the evaporator no longer operates as a flooded evaporator. The valve 86 exercises no control over the evaporator when the cooling load is heavy since this valve is maintained wide open and the valve 85 thereby assumes control over the evaporator.

The valve 86 may be operated by a motor 120 which may be a proportioning motor similar to the motor 95, this motor 120 being connected to the valve 86 by means of the link 121 connecting the operating arm 122 with the stem of the valve 86. The controller 115 includes a bulb 125 provided with a volatile fill and mounted in intimate contact with the pipe 87 connected to the outlet of the evaporator. The bulb 125 is connected by means of the capillary tube 126 with the expansible bellows 127, this bellows controlling the position of the wiper arm 128 which cooperates with potentiometer resistance 129. The outer terminals of the motor 120 are connected by means of conductors 130 and 131 with the extremities of the resistance 129 whereas the center terminal of the motor 122 is connected by means of the conductor 132 with the switch arm 135 of a relay 140. This relay includes a relay coil 141, an armature 142 to which are connected the arms 135, 136, and 137. The arm 135 cooperates with fixed contacts 143 and 144, arm 136 cooperates with the fixed contacts 145 and 146 and arm 137 cooperates with a fixed contact 147. When the relay coil 141 is deenergized the arms 135 and 136 move by means of gravity or any suitable biasing means (not shown) into engagement with the contacts 144 and 146. Upon energization of the relay the arms 135, 136, and 137 are moved into engagement with the contacts 143, 145, and 147, respectively. The operation of the relay 140 will be described below.

When the relay 140 is deenergized and the arm 135 is in engagement with the contact 144 the center and right hand terminal of the motor 120 are directly connected together as follows: from the center terminal through conductor 132, arm 135, contact 144, conductor 150, and conductor 151 to the right hand terminal of the motor 120. When these two terminals are directly connected together the valve 85 is moved by the motor 120 to its wide open position and the potentiometer 128 exercises no control over the motor since no current can flow through the potentiometer arm 129. The entire resistance 129 is connected between the center and left hand terminals of the motor at this time. Upon energization of the relay 140 and movement of the arm 135 into engagement with the contact 143 the center terminal of the motor 120 is connected to the wiper arm 128 of the potentiometer 129 as follows: by means of conductor 132 the arm 135 of relay 140, contact 143, and conductor 155 to the wiper arm 128. The amount of resistance between the terminals of the motor is now dependent upon the position of the wiper arm 128 with respect to the resistance 129 and it will therefore be apparent that the position of arm 122 operated by the proportioning motor 120 will depend upon the relative position of the arm 128 and resistance 129 and therefore the temperature of the refrigerant leaving the evaporator 68. Upon a rise in temperature of the refrigerant leaving the evaporator the valve 86 will move towards open position to permit a greater flow of refrigerant to the evaporator and conversely upon a drop in temperature of the refrigerant leaving the evaporator the valve 86 will move towards closed position. During the time that the valve 86 is in control of the evaporator 68, it will not be in a flooded condition.

It will now be understood that when the relay 140 is deenergized as illustrated the valve 86 will be maintained in a wide open position and the control of the evaporator will be by means of the expansion valve 85 which is controlled by the temperature of the air leaving the evaporator and passing over the bulb 103 to maintain the temperature of the air at 55° for example. When the relay 140 is energized however the valve 86 will be placed under the control of the controller 115 responsive to the temperature of the refrigerant leaving the evaporator and during the time that this valve is controlling the evaporator the evaporator will no longer be in a flooded condition since the temperature of the refrigerant leaving the evaporator will be maintained sufficiently high to insure some degree of superheat in the evaporator.

The valves 88 and 89' which control the flow of refrigerant from the evaporator directly to the compressor and by means of the heat exchanger 91 to the compressor respectively may be controlled by the solenoids 160 and 161, respectively, the arrangement being such that when the solenoids are energized the valves are moved to open positions and upon deenergization of the solenoids the valves move to closed positions. The selective energization of the solenoids 160 and 161 is controlled by the arm 136 of the relay 140. When the relay 140 is deenergized as illustrated power is supplied to the solenoid 161 as follows: from the line wire 165 through conductors 166, 167, arm 136, contact 146, conductor 168, solenoid 161, conductors 169, 170, and 171 to the line wire 172. With the relay in its deenergized position no power is supplied to the solenoid 160 and accordingly the valve 88 will be in its closed position. Upon energization of the relay 140 and movement of arm 136 into engagement with the contact 145 the solenoid 160 will be energized as follows: from the line wire 165 through conductors 166, 167, switch arm 136, contact 145, conductor 175, solenoid 160, conductors 176, 170, and 171 to the line wire 172. It will be understood of course that line wires 165 and 172 are connected to a suitable source of power (not shown). With the relay 140 in its energized position the circuit to the solenoid 161 is interrupted and the valve 89' will be in its closed position.

It will now be understood that when the relay 140 is deenergized expansion valve 86 is maintained in wide open position and expansion valve 85 controls the evaporator and maintains the same in a flooded condition, valve 88 is closed and valve 89' is opened so that the refrigerant must first pass to the heat exchanger 91 before returning to the compressor 75. However, with the relay 140 energized and valve 86 controlling the flow of refrigerant to the evaporator, the refrigerant leaving the evaporator will be in a state of superheat and since valve 88 is now open and valve 89' is now closed the refrigerant in its vaporous state will return directly from the evaporator to the inlet of the compressor 75. With the evaporator 68 operating as a flooded evaporator the refrigerant flowing through the pipe 87, valve 89', and pipe 90 will be at least partly in a liquid state and the refrigerant flows to a spray 180 whereupon it is sprayed over the pipes 181 in the heat exchanger 91. The vaporous refrigerant will be drawn from the heat exchanger 91 through the pipe 92 back to the compressor and the liquid refrigerant will flow over the coils 181 to the sump 182 whence it flows by means of the pipe 183, pump 184, and pipe 185 back to the spray 180. Accordingly as long as the evaporator 68 is operating as a flooded evaporator liquid refrigerant will be constantly supplied to the pipes 181 for a purpose to be hereinafter described.

The compressor motor 76 is a variable speed motor, the speed of which may be controlled by the controller 190. As illustrated in Figure 2 this controller 190 may consist of a motor 192 of the proportioning type carrying on the shaft 193 thereof a series of cams 194, 195, and 196. Switches 197, 198, and 199 mounted on levers 200, 201, and 202, respectively, are controlled by the cams 194, 195, and 196, respectively. The arrangement is such that as the cams are rotated by the motor 192 in a counter-clockwise direction as viewed in Figure 2, the switch 197 will first move to closed position followed by the sequential closure of the switches 198 and 199 as is apparent from the drawing. The motor 76 is provided with terminals 205, 206, 207, and 208 with power supplied to the motor by means of conductors 209 and with terminals 205 and 206 connected together the motor operates at low speed. When terminals 205 and 207 are connected together the motor operates at an intermediate speed and with terminals 205 and 208 connected together the motor operates at high speed. With switch 197 closed and the other switches 198 and 199 open as illustrated terminals 205 and 206 of the motor are connected together as follows: from terminal 205 to conductors 210, 211, 212, switch 197, and conductor 213 to the terminal 206. If now the switch 198 should be closed the terminals 205 and 207 of the motor will be connected together as follows: from terminal 205, conductors 210, 211, switch 198, and conductor 215 to the terminal 207. Upon closure of switch 199 terminals 205 and 208 are connected together as follows: from terminal 205 through conductors 210, 218, switch 199, and conductor 219 to the terminal 208. It will now be understood that when the switch 197 is closed the motor operates at low speed, upon closure of switch 198 the motor operates at an intermediate speed and upon closure of switch 199 the motor operates at high speed. With all of the switches open operation of the motor will stop.

Operation of the motor 192 which controls the speed of the compressor motor 76 is controlled primarily by the controller 225. This controller includes a bulb 226 mounted in intimate contact with the pipe 227 through which water flows to the individual air conditioning units 23, this bulb being connected by means of the capillary tube 228 to the bellows 229, the tube, bulb and bellows being provided with a suitable volatile fill. Bellows 229 will thus expand in response to a rise in the temperature of the water and contract upon a fall in water temperature in the pipe 227. Pivoted at 230 is a bell crank lever having an arm 231 biased by means of a spring 232 into engagement with the bellows 229, this lever also including an arm 235 which is arranged to sweep across a potentiometer resistance 236. The right extremity of resistance 236 is connected by means of conductors 238 and 241 with the left terminal of the motor 192 whereas the opposite extremity of the resistance 236 is connected by means of conductors 240 and 239 with the right terminal of the motor 192. The wiper arm 235 may be connected with the center terminal of the motor 192 by means of conductor 250, arm 260, of a relay 255, the contact 261 and conductor 262. Relay 255 is shown to comprise a relay coil 256 which controls the positions of the arms 257 and 260, the arm 257 engaging a contact 258 when the relay is deenergized and the arm 260 engaging the contact 261 when the relay is deenergized. Upon energization of this relay the arm 260 moves into engagement with a fixed contact 265 and the arm 257 is moved out of engagement with the fixed contact 258. With the relay 255 in its deenergized position the center terminal of the motor 192 is directly connected to the wiper arm 235 of the potentiometer 236 so that the proportioning motor 192 operates in response to the temperature of the water in the pipe 227. The arrangement is such that upon an increase in water temperature causing an expansion of the bellows 229 and movement of arm 235 toward the right the motor 192 will rotate the cams operated thereby in a counterclockwise direction a proportionate amount and in this manner the speed of the compressor motor 76 is increased in steps in response to an increase in the temperature of the water in the pipe 227. As the temperature of the water in the pipe decreases the speed of the compressor motor will be decreased in steps.

A controller 270 which responds to the pressure of the refrigerant entering the compressor through the pipe 89 is also provided to control the motor 192. This controller is shown to comprise a bellows 272 having its interior in communication with a pipe 89 whereupon the bellows will expand and contract as the pressure of the refrigerant flowing through the pipe 89 increases and decreases. A lever pivoted at 275 has an arm 276 biased by means of the spring 277 into engagement with the upper portion of the bellows 272, this lever also including an arm 280 which sweeps across a potentiometer resistance 281 in response to variations in pressure in the pipe 89. Upon a rise in pressure in the pipe the arm 280 will move toward the right and upon a decrease in pressure this arm will move toward the left under the influence of the biasing spring 277.

The controller 270 is arranged to control the operation of the motor 192 which in turn controls the speed of the compressor motor 76 when the relay 255 is energized. Upon energization of the relay 255 the connection between the arm 235 of the controller 225 and the center terminal of the motor 192 is broken and this terminal of the motor may now be connected with the arm 280 of the controller 270 as follows: from the center terminal of the motor 192 through conductor 250, arm 260, contact 265, conductor 284, mercury switch 285, and conductor 286 to the arm 280. The left end of the resistance 281 is connected to the right terminal of the motor 192 by means of conductors 290, 291, and 239. The right end of resistance 281 is connected to the left terminal of the motor 192 by means of conductors 294 and 241. Accordingly when the controller 270 is in control of the motor 192 by reason of the energization of relay 255 and the mercury switch 285 is in the position illustrated the motor 192 will operate to rotate the cams in a counterclockwise direction upon movement of arm 280 to the right due to a rise in the pressure of refrigerant entering the compressor whereupon the compressor speed is increased and as the pressure of the refrigerant entering the compressor is decreased the speed of the compressor may be correspondingly decreased.

The position of the switch 285 is controlled by means of a bellows 300 connected by the capillary tube 301 to a bulb 302 mounted in intimate contact with the pipe 227 through which water or other cooling fluid flows to the cooling unit 23, this tube, bulb and bellows being provided with a suitable volatile fill so that expansion and contraction of the bellows will take place in accordance with an increase or decrease in temperature of the water flowing through the pipe 227. The switch 285 is carried by a lever 305 pivoted at 306 and biased by means of the spring 307 into engagement with the bellows. With the switch 285 in the position illustrated the center terminal of the motor 192 is connected through the right hand contacts of the switch 285 with the arm 280 of the controller 270 as heretofore described. Should the temperature of the water flowing through the pipe 227 fall to a sufficiently low value the collapse of the bellows 300 will cause movement of the switch 285 to a position wherein the left hand terminals thereof are connected together by the mercury in the switch. When this happens the circuit to the arm 280 will be interrupted and the center and right hand terminals of the motor 192 will be directly connected together whereupon the motor 192 will rotate to an extreme position wherein the various switches controlled thereby are open and the compressor will stop. This connection between the center and the right-hand terminals of the motor 192 is as follows: from the center terminal through conductor 250, arm 260, contact 265, conductor 284 through the terminals in the left end of the switch 285 through conductors 310, 291, and 239 to the right hand terminal of the motor 192. It will now be seen that when the relay 255 is energized so that the speed of the compressor motor is controlled in accordance with the suction pressure a low limit control is provided to interrupt operation of the compressor in case the temperature of the water flowing through the pipe 227 should fall to a low enough value. This low limit controller has no effect on the operation of the compressor during the times that the relay 255 is deenergized since the speed of the compressor is then operated by the controller 225 in direct accordance with the temperature of the water in the pipe 227.

The pump 184 which causes the recirculation of the liquid refrigerant through the heat exchanger 91 is also controlled by the relay 255. Line wires 315 and 316 are provided for supplying power to the motor of this pump and with the relay 255 deenergized and the arm 257 in engagement with the contact 258 power is supplied to the pump motor as follows: from the line wire 316 through conductor 320, contact 258, switch arm 257, conductor 321, the motor of pump 184 and conductor 322 to the line wire 315. Upon deenergization of the relay 255 the circuit to the pump 184 is interrupted so that refrigerant is no longer recirculated through the exchanger 91.

The energization of the relay 255 is controlled by means of a timer 325 controlling the position of a mercury switch 326. This timer includes a motor 327 which rotates through suitable reduction gearing, a shaft 329 on which is mounted a cam 330. This cam controls the position of an arm 331 pivoted at 332 and carrying the mercury switch 326. The energization of the timer motor 327 is controlled by the switch arm 137 of the relay 140. When this relay is energized and the arm 137 is moved into engagement with the contact 147 power is supplied to the motor 327 as follows: from the line wire 172 through conductor 171, contact 147, switch arm 137, conductor 335, motor 327, and conductor 336 to the line wire 165. Energization of the motor 327 causes rotation of the cam 330 to a position wherein the mercury switch 326 is moved to closed position. Upon deenergization of the relay 140 the circuit to the motor 327 is interrupted and this motor may be operated under the influence of a suitable biasing means, not illustrated, back to the position shown wherein the switch 331 is moved to open position. It should be understood of course that the motor 327 might be a reversible motor and positively driven in the reverse direction upon deenergization of the relay 140 by engagement of arm 137 with a suitable contact controlling the other circuit of the motor 327.

Movement of switch 326 to its closed position closes a circuit to the relay 255 as follows: from the line wire 172 through conductor 340, mercury switch 326, conductor 341, relay coil 256, and conductor 342 to the line wire 165. It will now be understood that the relay 255 will be energized by means of the timer 325 a predetermined length of time, which might be two minutes for example or any other suitable length of time, subsequent to the energization of the relay 140.

As heretofore explained energization of relay 140 places the evaporator under the control of the expansion valve 86 which operates in response to the temperature of the refrigerant leaving the evaporator 68, closes the valve 89' and opens the valve 88 so that the refrigerant leaving the evaporator flows directly to the compressor. At the same time the timer 327 starts to operate so that a short time after the energization of the relay 140 the relay 255 will be energized whereupon the control of the speed of the compressor motor is transferred from the controller 225 which is responsive to the temperature of the water in the pipe 227, to the suction pressure controller 270, there being a low limit controller 285 for preventing operation of the compressor should the temperature of the water flowing through the pipe 227 drop to an excessively low value. Accordingly energization of relay 140 results in the evaporator 68 changing from a flooded evaporator to an evaporator operating with the refrigerant leaving in a state of superheat and also results in the compressor being controlled in accordance with the suction pressure instead of the temperature of the water in the pipe 227, and at the same time the pump 184 stops operating. The time delay allows evaporator water cooler 91 to be partially evacuated before the compressor 75 pulls the major portion of its refrigerant from coil 68.

City water may be utilized as the cooling medium in the coils in the unit conditioners 23 as well as the coils 67 and 70 located in the air conditioning chamber, this water entering the system by means of the pipe 350 in which may be interposed a manual valve 351 and an automatically operated valve 352. The water flowing past the valve 352 flows by way of the pipe 353 into a distributing head 354 to which are connected the pipes 181 over which liquid refrigerant is sprayed during the time that the system is operating with the relay 140 deenergized. The water leaves the pipes 181 by way of the distributing head 355 whence it flows through the pipes 227 and pipes 360 into the spaces 10 and 11. From the pipes 360 the water may flow through the coils 25 of the conditioners 23 or may flow through the by-pass pipe 28 upon opening of the valves 29 as heretofore explained. The water leaving the conditioners 23 or flowing through the valves 29 then flows through the pipes 362 into the pipe 363, this pipe branching into pipes 364 and 365. A valve 366 is provided for controlling the flow of water into the pipe 364, this valve being a variable position valve operated by a proportioning motor 370 connected to the motor by means of a link 372. Interposed in the pipe 365 is a two-position valve 375 which may be operated by means of a solenoid 376, deenergization of this solenoid causing closure of the valve. During normal operation of the system during the cooling season the solenoid 376 is energized by means to be hereinafter described so that flow of water through the pipe 365 is permitted. The water flowing past the valve 366 flows through a pipe 380 to the distributing pipe 381. Pipes 382, 383 and 384 which terminate in upwardly directed sprays are connected to the distributing pipe 381, valves 385, 386, and 387 being provided to control the flow of water through the pipes 382, 383, and 384, respectively. Suitable operating means such as solenoids 390, 391, and 392 are provided to control the valves 385, 386, and 387, respectively, these solenoids being controlled in a manner to be hereinafter described. The water leaving the pipes 382, 383, or 384 is sprayed upwardly where it is used for cooling the refrigerant passing through the condenser coils 78, the water then draining from the bottom of the chamber 80 through the outlet pipe 391. A valve 392 which may be manually operated is provided for controlling the flow of water through the drain pipe 391.

The water passing through the pipe 365 flows through the coil 70 and this water may be relatively warm since it has extracted heat from the air in the spaces 10 and 11 and from the coil 70 the water flows by way of the pipe 400, valve 401, and pipe 402 to the precooling coil 67. The water in the coil 70 will be cooled since it gives up much of its heat to the cool air flowing through the chamber 20 and this water is then used in the coils 67 for precooling the air entering the chamber 20. After passing through the coil 67 the water flows through the pipe 403 where it joins the flow of water through the pipe 380 which is flowing to the distributing pipe 381. The valve 401 which controls flow of water through the pipe 402 may be operated by a solenoid 405, the arrangement being such that the valve is open only so long as the solenoid 405 is energized. This valve 401 is controlled simultaneously with the vlave 375 as will be hereinafter set out and during the cooling season will be normally in open position. The valve 366 controls the amount of water which by-passes the coils 70 and 67 and therefore controls the amount of heat that is extracted from the air by the coil 67.

It is desirable to maintain the temperature of the water leaving the coil 67 a few degrees below the temperature of the air entering the air conditioning chamber and for this purpose the controller 410 is provided for controlling the motor 370 which in turn controls the position of the valve 366 in a manner to so control the flow of water through the coils 70 and 67 that the temperature of the water leaving the coil 67 will be slightly below the temperature of the outdoor air. The controller 410 comprises a pair of potentiometers electrically connected, one of the potentiometers being operated in accordance with the temperature of the water flowing through the pipe 403 and the other potentiometer being operated by the temperature of the air entering the chamber 20. Mounted in intimate contact with the pipe 403 is a bulb 420 connected by means of a capillary tube 421 to a bellows 422, this tube, bulb, and bellows being provided with a suitable volatile fill. Pivoted at 423 is a lever having an arm 424 biased by means of a spring 425 into engagement with the bellows 422 and an arm 426 arranged to sweep across the potentiometer resistance 428. A bulb 430 is mounted in the inlet of the air conditioning chamber 20 so as to respond to the temperature of the air being admitted thereto this bulb being connected by means of the capillary tube 431 to the bellows 432 and being provided with a suitable volatile fill. Pivoted at 433 is a lever having an arm 434 biased by means of the spring 435 into engagement with the bellows and an arm 436 arranged to sweep across the potentiometer resistance 438.

The upper terminal of the motor 370 is connected by means of conductors 440 and 441 with the right end of resistance 428. The same terminal is connected to the left end of resistance 438 by means of conductors 440 and 442. The lower terminal of motor 370 is connected by means of conductors 444, 445, and 446 with the left end of resistance 428 and is connected with the right end of resistance 438 by means of conductors 444 and 448. The center terminal of the motor 370 is connected by means of conductors 450, mercury switch 451, conductors 452, 453, resistance 454, and conductor 455 with the slider 436 which cooperates with the potentiometer resistance 438. The center terminal is also connected with the slider 426 of the potentiometer 428 by means of conductors 450, mercury switch 451, conductors 452, 460 and the center tapped resistance 461. It will now be seen that if the mercury switch 451 is in the position illustrated in Figure 2 that the potentiometers 428 and 438 are connected in parallel with the proportioning motor 370. The circuit to the slider 436 of the potentiometer 438 has included therein the resistance 454 which renders this controller less sensitive than the controller 428. In other words if the slider 426 of the potentiometer 428 moves through the distance X it will cause the motor 370 to move from open to closed positions. In order to impart a similar movement to the motor 370 by the controller 436 this controller must move through the entire range of the potentiometer 438. The result of this is that a movement of the slider 436 has the effect of shifting the control range of the slider 426 so that this controller which responds to the temperature of the water will maintain the valve in such a position that the temperature of the water will have a certain value which will in turn depend upon the position of the controller 436 or in other words upon the temperature of the air entering the air conditioning chamber 20. As the slider 436 moves toward the right in response to an increase in temperature it will have the effect of shifting the control range X of the slider 426 toward the right so that the temperature of the water leaving the coil 67 will be raised and will be maintained slightly below the temperature of the air entering the chamber 20. The purpose of the center tapped resistance 461 over which the slider 426 moves is to insure that the length of the control range X of this slider arm will be the same regardless of the particular portion of this slider arm with respect to the potentiometer 428.

As stated above, the circuits between the center terminal of the motor 370 and the slider arms 426 and 436 includes the mercury switch 451. This switch is mounted on a lever 470 pivoted at 471 and biased in a clockwise direction by means of the spring 474. A humidity responsive element of conventional construction and which may be formed of human hairs or any other suitable humidity responsive elements is located as shown in Figure 1 in the path of air leaving the duct 17 through which air being exhausted from the various spaces being conditioned flows. This humidity responsive element 472 may be fixed at one end and has its other end connected to lever 470 in such a manner that as the humidity of the air leaving the duct 17 decreases the humidity responsive element 472 contracts and moves the lever 470 in a counter-clockwise direction. Should the humidity become excessively low this contraction of the element 472 will cause the mercury switch 451 to be tilted in the opposite direction from that shown wherein the contacts at the left end thereof are electrically connected by means of the mercury element in the switch. When this happens the center and lower terminals of the motor 370 will be directly connected together as follows: from the center terminal through conductor 450, the contacts in the left end of mercury switch 451, conductors 476, 445, and 444 to the lower terminal of the motor 366. When the center and lower terminals of the motor are directly connected together in this manner the valve 366 is thereby moved to wide open position regardless of the positions of the sliders 426 and 436 so that substantially all the water will flow directly through the pipe 380 to the sprays in the tower 80 and will by-pass the coils 70 and 67 in order to reduce the amount of dehumidification that takes place in the air conditioning chamber 20. It will be understood of course that only under unusual circumstances will the humidity of the air become excessively low during the summer-time so as to cause this operation of the valve 366, so that normally this valve will be so operated as to maintain the temperature of the water leaving the precooling coil 67 slightly below the temperature of the air entering the chamber 20.

Located also in the outlet of the duct 17 is the bulb 500 of a controller 501, this bulb, which is provided with a volatile fill, being connected by the capillary tube 502 to the bellows 503. The bellows 503 will expand or contract directly in response to increase or decrease in temperature of the discharged air leaving the duct 17. Pivoted at 505 is a lever having an arm 506 biased by the spring 507 into engagement with the bellows 503, this lever also including an arm 508 which forms the slider of a potentiometer 509. This potentiometer controls the operation of a proportioning motor 510, conductor 511, connecting the slider 508 to the center terminal of the motor 510 and conductors 512 and 513 connecting the extremities of the resistance 509 with the outer terminals of the motor 510. It will now be understood that the shaft 515 operated by the motor 510 will assume angular positions which are proportional to variations in the discharge air temperature.

The shaft 515 carries a plurality of cams 516, 517, and 518 which control the positions of pivoted arms 520, 521, and 522, respectively. The arm 520 carries a mercury switch 525 which controls the energization of the relay 140. The arrangement is such that upon a drop in the discharge air temperature the cams carried by the shaft 515 will rotate in a counter-clockwise direction and if the discharge air temperature decreases sufficiently the cam 516 will cause the mercury switch 525 to be tilted in the opposite direction thus connecting the terminals in the mercury switch and closing a circuit to the coil 141 of the relay 140 as follows: from the line wire 172 through conductors 530, 531, mercury switch 525, conductor 532, relay coil 141, and conductors 533 and 166 to the line wire 165. It will thus be seen that when the discharge air temperature drops sufficiently the relay 140 is energized which in turn causes the operation of the various mechanisms controlled thereby as previously described.

The arm 522 carries a mercury switch 540 having a pair of terminals in each end thereof. When the mercury switch is in the position illustrated the solenoid 376 controlling the valve 375 is energized as follows: from the line wire 172 through conductors 530, 545, the terminals at the right end of switch 540, conductors 546, 547, solenoid 376, conductors 548, 549, 550 to the line wire 165. The solenoid 405 controlling the valve 401 is likewise energized with the mercury switch 540 in the position illustrated as follows: from line wire 172 through conductors 530, 545, mercury switch 522, conductors 546, 552, solenoid 405, conductors 554, 549, and 550 to the line wire 165. It will thus be apparent that with the mercury switch 540 positioned as illustrated valves 375 and 401 will both be open thus permitting a flow of water to and from the coil 70. Upon movement of the mercury switch 540 to its opposite position in response to a further drop in the discharge air temperature beyond that at which the mercury switch 525 is tilted to its opposite position, the above described circuits to the solenoids 376 and 405 are interrupted whereupon the valves 375 and 401 move to closed positions preventing flow of water into the coil 70 by way of the pipe 365 and the valve 375.

A steam supply pipe is represented by the reference character 560 and the flow of steam through this pipe and into the pipe 365 leading to the coil 70 is controlled by a valve 561, the position of which may be controlled by a proportioning motor 562, this motor being connected by means of the link 563 with the stem of the valve 561. The operation of the motor 562 is controlled by a controller 570 and the mercury switch 571 carried by the pivoted arm 521 which is in turn controlled by the cam 517. This mercury switch 571 is arranged to be moved simultaneously with the mercury switch 540. Thus when the switch 540 is moved to its opposite position in response to a drop in the discharge air temperature to a predetermined value, the switch 571 will be simultaneously tilted to its opposite position. With the switch 571 in the position illustrated the center and right-hand terminals of the motor 562 are directly connected together as follows: from the center terminal through conductor 576, the right end terminals of the mercury switch 571 and conductors 577 and 578 to the right end terminal of the motor 562. When these terminals are thus directly connected together the motor 562 is operated to move the valve 561 to its fully closed position wherein no steam is supplied to the coil 70. The controller 570 includes a bulb 580 positioned in the discharge from the fan 21, this bulb being connected by means of a capillary tube 581 with the bellows 582, the tube, bulb, and bellows being provided with a suitable volatile fill. As the discharge air temperature from the fan 21 drops the bellows 582 contracts and upon an increase in this air temperature the bellows 582 will expand. Pivoted at 583 is a lever having an arm 584 biased by means of a spring 585 into engagement with the bellows, the lever also including an arm 586 arranged to cooperate with the potentiometer resistance 587. The right end of this resistance 587 is connected by means of conductors 590 and 577 with the right hand terminal 562 whereas the left terminal of this motor is connected to the left end of resistance 587 by means of conductor 591. When the mercury switch 571 is tilted in its opposite direction from that illustrated the slider arm 586 is connected to the center terminal of the motor 562 by means of conductors 593, mercury switch 571, and conductor 576. It will thus be apparent that when the temperature of the air leaving the duct 17 drops sufficiently low that the switch 571 is tilted to its opposite position, the motor 562 controlling the position of the valve 561 will be controlled by the controller 570 responsive to the temperature of the air leaving the fan 21. Accordingly when the discharge air temperature from the fan drops the slider 586 will move toward the left whereupon the motor 562 will open the valve 561 a corresponding amount and in this way the supply of steam to the coil 70 is varied directly in proportion to the temperature of the air leaving the fan 21 in a manner to maintain a constant discharge air temperature at the outlet of the fan.

The coil 70 is provided at its lower end with a drain pipe 600 controlled by a valve 601. The position of this valve may be controlled by a solenoid 602 and arranged to open the valve only upon energization of this solenoid. It is intended that this valve shall be normally closed during the cooling season and opened simultaneously with the closure of the valves 375 and 401 and the opening of the steam supply valve 561. Accordingly this solenoid is controlled by the mercury switch 540 and when the switch is in the position illustrated the solenoid 602 is de-energized so that the valve 601 remains in closed position thus preventing flow of water from the coil 70. When the air leaving the duct 17 is sufficiently cold and the mercury switches 540 and 571 are tilted to their opposite positions a circuit is completed through the solenoid 602 as follows: from the line wire 172 through conductors 530, 545, the left hand terminals of the switch 540, conductor 605, the solenoid 602, and conductors 606 and 550 to the line wire 165. Accordingly as soon as steam is supplied to the coil 70 and the flow of water to the coil is interrupted the valve 601 is opened to permit the drain of condensate or the exhaust of steam from the coil 70.

The valve 352 which controls the flow of water into the system is controlled by a motor 610 which may be a motor of the proportioning type and which is connected by means of the link 611 to the valve 352. Mounted in intimate engagement with the pipe 363 which carries the water discharged from the conditioning units 23 is a bulb 615 connected by means of a capillary tube 616 with a bellows 617, this tube, bulb, and bellows being provided with a volatile fill. The bellows 617 controls the position of the slider 618 which cooperates with the potentiometer resistance 619, the arm 620 connected to the slider being biased by means of the spring 621 into engagement with the bellows 617. Conductors 622 and 623 connect the extremities of resistance 619 with the outer terminals of motor 610 and conductor 625 connects the slider 618 with the center terminal of motor 610. Upon a rise in temperature of the water flowing through pipe 363 the bellows 617 will expand and move the slider 618 to the right which in turn will cause motor 610 to move the valve 352 to open position and in this manner the supply of water to the system is varied so as to maintain substantially constant the temperature of the water flowing in the pipe 363.

It is usually desirable to circulate the water through the system only once but in certain localities the price of water may be very high or the city water supply may not be available at a sufficiently low temperature so that a recirculation of water in such cases may be desirable. If this is the case the drain valve 392 will be closed to prevent water draining from the system, the valve 350 may also be closed and a pump 630 may be provided for pumping water from the bottom of the chamber 80 back to the inlet pipe 353 thus causing a recirculation of the water. An inlet supply pipe 632 controlled by a float valve 633 and operated by the float 634 is provided for insuring the maintenance of a predetermined level of water in the bottom of the chamber 80. The pipe 632 may be provided with a manual shut-off valve 635 whereby the supply of water to the pipe 632 is prevented except in those instances it is desired to recirculate the water.

During the winter-time it may be desirable to add water to the air passing through the chamber 20 in order to raise the humidity thereof. For this purpose a pipe 640 is connected to the pipe 364 which will be supplied with water and this pipe communicates with the spray 641, this communication being controlled by the valve 642. The valve 642 may be operated by a solenoid 643 and arranged to open the valve only when the solenoid is energized. A mercury switch 645 controls the energization of the solenoid 643 and this switch is arranged to be operated by the humidity responsive device 472. This switch may be mounted on a lever 648, the levers 648 and the lever 470 which carries the mercury switch 451 being mounted on a common shaft so that both switches will be simultaneously moved by the humidity responsive device 472. When the humidity of the air leaving the duct 17 is sufficiently low that the switch 645 is tilted to closed position the solenoid 643 will be energized as follows: from a line wire 650 through the switch 645, conductor 651, solenoid 643, and conductor 652 to the line wire 653. It will thus be seen that when the humidity of the air leaving the various spaces being conditioned drops sufficiently the valve 642 is opened permitting flow of water from the spray 641 whereupon the humidity of the air is increased.

Referring now to the heat exchanger chamber 80 which includes condenser coils 78 of the refrigeration system, a fan 660 is provided for drawing air leaving the spaces 10 and 11 upwardly past the various condenser coils whereupon this air may be discharged into the outside atmosphere. The fan 660 may be driven by a suitable motor 661. The air entering the bottom of the chamber 80 will be relatively dry and in order that maximum cooling of the condenser coils 78 may be effected at maximum efficiency this air is mixed with water issuing from the spray nozzles at the ends of the pipes 382, 383, and 384. The purpose of providing different sprays at different levels in the tower 80 is in order that the temperature of the air passing over these coils may be controlled in a manner to obtain the maximum possible cooling of the refrigerant in the condenser coils.

In order that the cooling tower 80 operate at maximum efficiency, it is necessary that the water enter the tower at or slightly above the wet bulb temperature of the air passing the point of entry of the water. Since both the wet bulb temperature of the air and the water temperature may vary in accordance with the load on the cooling system, and since the water temperature in the pipe 381 will be higher where the load on the cooling system is high, it is necessary to vary the point of admission of the water in accordance with the temperature thereof and the wet bulb temperature of the air passing through the cooling tower. In order to determine the proper point of entry of the water, thermostats for controlling each of the spray pipes 382, 383, and 384 are located above the respective condensing coils toward which the sprays are directed. By so locating the thermostats, the wet bulb temperature of the air, the water temperature at the point of entry and the amount of heat absorbed from the condenser will have a chance to equalize. It should be understood that the fine portion of the spray, the part that does the most effective equalization of dry and wet bulb temperatures, travels along with the air as fine drops up to the eliminators 395 located near the top of the cooling tower, and comes down back with the coarser spray, thus effectively passing the condenser coils 78 twice. On the way up, this mist helps to keep the air in a saturated condition and hence at a lower dry bulb temperature, whereas on the way down, it adds to the mechanical sluicing effect of scrubbing the surfaces of the condenser coils and hence it aids the heat transfer by decreasing the size of the water film. Obviously, it would not be to advantage to admit the water to the air at a point where the water temperature is below the wet bulb temperature of the air since at this time the water would not increase the ability of the air to absorb heat from the condenser coils. Accordingly means are provided, as described below, for causing the water to issue from the proper spray so that the temperature of the water will approximate the wet bulb temperature of the air at the point where the spray commingles with the air passing upwardly through the tower. It might be noted that the pressure of the water at the lowest spray will be higher than the pressure in the upper sprays, and accordingly, the nozzles in the lowest spray may be made somewhat finer than those in the upper sprays so that the mist may be kept as fine as possible at all times to obtain the maximum cooling effect of the water.

For controlling the valves 385, 386, and 387 the controllers generally represented by the reference characters 665, 666, and 667, respectively, are provided. These controllers each include a bulb connected by means of a capillary tube 668 to a bellows 669, the tube, bulb, and bellows being provided with a suitable volatile fill so that the bellows will expand and contract in accordance with variations in temperature of the air passing thereover. It will be understood upon reference to Figure 1 that the various bulbs will be located within the cooling tower whereas the bellows and mechanism operated thereby will be located outside of the cooling tower. The various bellows control the positions of contact arms 700, 701, and 702 which are biased by means of the springs 703 into engagement with the bellows, the arms being pivoted at 704. Each of the arms may be arranged to engage any one of three different contacts in accordance with variations in temperature at the respective bulbs as is apparent from Figure 2.

Mounted in engagement with the outside of the pipe 380 through which water is supplied to the various sprays is a bulb 705 connected by the capillary tube 706 to the bellows 707 which controls the position of the switch arm 708. Circuit connections are controlled by the switch arm 708 and the switch arms 700, 701, and 702 so that the water will be supplied to the tower at a point at which the temperature of the water leaving the spray is approximately the same as the temperature of the air and water mixture passing upwardly through the cooling tower. Let it be assumed, for example, that the temperature of the water passing through the pipe 380 is approximately 85° and the switch arm 708 is in engagement with the contact 710. The temperature of the air passing upwardly through the tower may be assumed to be 80° at the location of the bulb 667, 85° at the bulb 666, and 90° at the bulb 665. It will accordingly be seen that the water temperature is substantially the same as the temperature of the air at the bulb 666 and it is accordingly desirable to admit water to the tower through the valve 386. The operating motor 391 for the valve 386 will be energized through the following circuit: from the line wire 172 through conductor 680, switch arm 708, the contact 710, conductors 716, 717, 718, contact 719, switch arm 701, conductor 720, motor 391, conductors 721, 722, and 723 to the line wire 165. Water will now be admitted to the tower by means of the spray pipe 383, or in other words, at the location therein wherein the water temperature is substantially the same as the air temperature.

Assume now that the temperature of the water through the pipe 380 should decrease to approximately 80° F. whereupon the switch arm 708 is moved downwardly into engagement with the lower contact 725 but that the temperature of the air at the various bulbs is approximately the same as in the example given above. Since the temperature of the water is now about the same as the temperature of the air farther down the tower or at the bulb 667 it will be desirable in order to cause the water to effect the maximum cooling possible to supply the water to the tower by way of the spray pipe 384. At this time the valve motor 392 will be energized as follows: from the line wire 172 through conductor 680, switch arm 708, contact 725, conductors 730, 731, contact 732, switch arm 702, conductor 733, valve motor 392, and conductors 734, 722, and 723 to the line wire 165. It will now be seen that the valve 387 will be opened and water admitted to the lowest spray pipe within the tower.

Let it be assumed now that the water temperature in the pipe 380 is 85° but that the temperature of the air passing upwardly through the cooling tower should decrease so that the arm 702 moves downwardly out of engagement with the contact 732, the temperature of the air at 666 drops to 80° whereupon the arm 701 moves into engagement with the lower contact and at the point 665 the temperature of the air drops to 85° and arm 700 moves into engagement with the contact 740. In this case it will not be desirable to admit water below the spray pipe 382 since the water will not assist the air in the cooling of the condenser until the air temperature has increased to that of the water temperature which is at the bulb 665. The valve motor 390 will now be energized as follows: from the line wire 172 through conductor 680, switch arm 708, contact 710, conductors 716, 717, 745, contact 740, switch arm 700, conductor 741, valve motor 390, conductors 742, 723 to the line wire 165.

Without tracing all of the circuits or combinations possible it will be apparent that with the control system illustrated for the admission of water to the cooling tower 80, that the water will be admitted to that portion of the tower wherein its temperature is substantially that of the temperature of the air passing upwardly therethrough. Should the cooling load on the system be excessively high, the temperature of the water passing through the pipe 380 might be high enough so that none of the valves 385 to 387 would be opened and in this case the relief valve 388 would admit water to the spray pipe 389 located in the uppermost portion of the cooling tower.

It should be understood that the various temperature values mentioned above are given by way of example only and in actual practise the various controllers may respond to temperatures other than those stated to perform the proper control functions and to admit the water at the proper levels within the cooling tower.

*Operation*

Assume that the system is being started up and that the outdoor air entering the chamber 20 has a dry bulb temperature of 100° F., a wet bulb temperature of 80° F. and a dew-point temperature of 72° F. The thermostat 30 in the various spaces being conditioned will be calling for cooling and accordingly the valves 29 which permit water to by-pass the unit conditioners 23 will be closed and the motors 27 driving the fans 26 will be operating to recirculate room air through the unit conditioners. City water will enter the heat exchanger 91, the amount of water entering the system being controlled by the bulb 615 which responds to the temperature of the water leaving the conditioners 23 and may be adjusted to maintain this temperature at approximately 75°. The water passing through the heat exchanger 91 will be cooled by the refrigerant flowing over the pipes 181 and the temperature of this water will be controlled by controlling the speed of the compressor in accordance with the temperature of the water passing through the pipe 227 to maintain the temperature of this water at 60° for example. This water therefore enters the unit conditioners at approximately 60° and therefore cools the air being recirculated through the room and the unit conditioners. The expansion valve 86 at this time will be entirely open since the relay 140 will be deenergized, the cams 516, 517, and 518 operated by the motor 510 being in the positions illustrated since the discharge temperature of the air leaving the spaces is relatively high. Accordingly the amount of refrigerant entering the evaporator 68 will be controlled by the expansion valve 85 in a manner to maintain the temperature of the air leaving the coils 68 at approximately 55° F. which will be near the saturation air temperature since the air has been cooled below its entering dew-point. The temperature of the air entering the coil 68 or in other words, leaving the coil 67 is controlled by controlling the volume of water passing through the precooling coil 67 in such a manner that the temperature of this water is maintained slightly below the temperature of the incoming air by means of controller 410. The temperature of the air leaving the coil 67 may therefore be reduced to approximately 73° dry bulb temperature. The air which leaves the coil 68 at 55° F. will be reheated by the relatively warm refrigerant flowing in the tempering coil 69 on the way to the evaporator 68 and this air may now be raised to a 60° dry bulb temperature. The air is further reheated to approximately a 70° dry bulb temperature by the reheating coil 70 through which water which leaves the unit air conditioners at approximately 75°, passes.

The condenser coils 78 will be cooled by the flow of discharge air upwardly through the cooling tower 80 and the water leaving the system and issuing from one of the spray pipes 382, 383, and 384 or 389. The system will continue to operate in this manner to maintain the various temperature values and the temperatures in the individual spaces may be individually controlled by the room thermostats therein which control the operation of the fans from the unit conditioners and the flow of water through the cooling coils therein. Since the temperature of the water is controlled by the refrigerant leaving the evaporator 68 which has reduced the temperature of the air below its dew-point, the temperature of the water passing to the unit conditioners will be sufficiently high as to prevent the condensing of any moisture in these conditioners. In other words, the air in the spaces will have a dew-point considerably below the temperature of the water passing through the cooling coils 25 and the unit conditioners 23.

If the temperature of the air leaving the spaces and passing to the tower 80 drops sufficiently indicating a need for less refrigeration by the refrigerating system the motor 510 will be operated by the controller 501 which responds to this discharge air temperature and after this temperature has dropped sufficiently the cam 516 operated by the motor 510 will tilt the mercury switch 525 to closed position. When this happens the relay 140 is immediately energized whereupon the valve 88 is opened and the valve 89' is closed so that the refrigerant leaving the evaporator will now flow directly to the compressor. At the same time the expansion valve 86 will be placed under the control of the controller 115 which responds to the temperature of the refrigerant leaving the evaporator 68 and this insures that the refrigerant leaving the evaporator will be in a state of superheat so that only refrigerant in a vaporous state will pass into the compressor. The energization of the relay 140 also causes the energization of the motor 327 of the timer 325 so that after a certain length of time the mercury switch 326 is closed and the relay 255 is energized. Energization of this relay interrupts operation of the pump 184 and places the control of the compressor onto the suction pressure responsive controller 270. The compressor will now operate at a speed necessary to maintain the suction pressure at a desired value. The purpose of interposing a delay by means of the timer 325 between the operation of valves 88, 89, and 86 and the stopping of the pump 184 and the transfer of the control of the compressor speed to the suction pressure controller 270 is to insure the excess liquid refrigerant in the heat exchanger 91 will be evaporated before the pump 184 is stopped and so that the speed of the compressor will not be such so as to reduce the temperature of the water passing through the pipe 227 below a desired value. Obviously it will require a certain length of time to purge the heat exchanger 91 of the liquid refrigerant therein. The provision of the low limit controller 285 also insures that the compressor speed will not be such as to reduce the water temperature below a desirable value after the control of the compressor speed has been transferred to the suction pressure controller.

After the valves 88, 89, and 86 have been operated as described no refrigerant passes to the heat exchanger 91 so that the water entering the individual air conditioning units will not be precooled but will be at the temperature of the main water supply. The load on the refrigerating system is consequently reduced. If the temperature of the discharge air should further decrease the cams 517 and 518 will tilt the mercury switches operated thereby to their other positions thus causing closure of valves 375 and 401 and opening of the valve 601 and placing of the steam valve 561 under the control of the controller 570 responsive to the temperature of the air leaving the fan 21 to maintain this temperature at a desirable value. Water is supplied to the spray 641 whenever the humidity of the air leaving the spaces being conditioned drops to an undesirable value.

It is desirable under normal conditions to circulate the water through the system only once but if the price of water is prohibitive or the temperature of the water supply is excessive then the water may be recirculated by the pump 630 by closing the drain valve 392, the main supply valve 351, and opening the supply valve 635 whereupon the float controlled valve 633 controls the supply of water to the system.

It will thus be seen that I have provided an air conditioning system wherein a supply of water is utilized as an effective heat exchanger element in conjunction with a cooling system for controlling the temperature of this water and the temperature of the air being conditioned. Air at a constant dry bulb temperature is admitted to the various spaces, the temperature of this air being efficiently controlled and individual control of the various spaces is attained by circulating the cooling water through the individual air conditioning units in the spaces. It is obvious that a steam, electric or other suitable water heater may be substituted for water cooler 91 and properly controlled for heating as is customary in the art, and a reversing switch of the type well known in the art might be provided between thermostat 30 and relay 35 to enable the control of units 23 to operate on heating in the same way as on cooling.

It is also obvious that if water at 350 were available at 65° or below, water cooler 91 and its attendant controls could be omitted.

Having described a preferred form of my invention many modifications may become apparent to those skilled in the art and it should be understood that my invention is limited only by the scope of the appended claims.

I claim as my invention:

1. In a system of the class described, a space cooling means, means for circulating a cooling fluid through said cooling means to reduce the space temperature, means for reducing the temperature of said cooling means including a refrigeration system having a condenser and an evaporator, a cooling tower for said condenser, said condenser having portions thereof at different levels within said tower, means for circulating air from said space upwardly through said tower and over said condenser, means for spraying the cooling fluid leaving said cooling means into the stream of air passing through said tower, and means for causing said cooling fluid to be sprayed into the air stream at a point wherein the wet bulb temperature of the air and the temperature of the water are substantially the same.

2. In a system of the class described, a cooling tower, a plurality of coils within said tower situated at different levels therein, means for causing a flow of fluid to be cooled downwardly through said coils, means for causing a flow of air upwardly through said tower, a source of cooling fluid having a variable temperature, means for causing a spray of said cooling fluid to be admitted to said tower selectively at different levels therein, means responsive to the temperature of the air at said different levels, means responsive to the temperature of said source of cooling water, and means operated jointly by said last two means for controlling the point of admission of said spray so that the temperature thereof is substantially the same as the wet bulb temperature of the air at said point.

3. In a system of the class described, a cooling tower, a plurality of coils within said tower situated at different levels therein, means for causing a flow of fluid to be cooled downwardly through said coils, means for causing a flow of air upwardly through said tower, a source of cooling fluid having a variable temperature, means for causing a spray of said cooling fluid to be admitted to said tower selectively at different levels therein, said means including a plurality of upwardly directed spray pipes located at different levels within the tower, valve means controlling the various spray pipes, and temperature responsive means spaced upwardly from each of the various spray pipes controlling the flow of cooling fluid from the spray pipe located immediately therebelow.

4. An air conditioning system for a building having a plurality of spaces therein to be conditioned, means for causing a circulation of air through said building, an air conditioning chamber through which the air being circulated through the building passes, cooling means in said chamber for dehumidifying the air passing therethrough, means responsive to the humidity of the air leaving the building in control of said cooling means, unit air conditioners including cooling means in the various spaces being conditioned, means responsive to the temperature of the various spaces for controlling the respective unit conditioners, and a single refrigerating plant for supplying a cooling effect to all of said cooling means.

5. An air conditioning system for a building having a plurality of spaces therein to be conditioned, a central air conditioning chamber, means for circulating air through said air conditioning chamber and delivering the air to the various spaces to be conditioned, means in said chamber for lowering the temperature thereof and for reducing the moisture content thereof, means in the various spaces for further reducing the temperature thereof without effecting any dehumidification, a refrigerating apparatus, means employing said refrigerating apparatus for effecting the conditioning of the air in the air conditioning chamber and the cooling of the air in the various spaces, condition responsive means in the various spaces in control of the cooling means therein to maintain the temperature of each space at a desired value, means for exhausting the air from the building, and means responsive to the humidity of the air being exhausted in control of the means in the central air conditioning chamber.

6. An air conditioning system for a building having a plurality of spaces to be conditioned, means for circulating fresh air through said building, a central air conditioning chamber through which said air passes on the way to the various spaces within the building, unit air conditioners in the various spaces for controlling the temperature thereof, means for circulating a cooling fluid therein, dehumidifying means within said air conditioning chamber comprising an evaporator of a refrigeration system, means including said refrigeration system for controlling the temperature of the cooling fluid which is circulated in said unit air conditioners, means responsive to the temperature of the various spaces for controlling the flow of cooling fluid through the respective air conditioners, and means utilizing the air leaving said spaces and the cooling fluid leaving said unit conditioners for cooling the condenser of the refrigeration system.

7. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves for controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, and means for rendering said thermostatic expansion valve ineffective and placing said other valve in control of the flow of refrigerant upon an increase in the temperature of the air leaving said space.

8. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, means for rendering said thermostatic expansion valve ineffective and placing said other valve in control of the flow of refrigerant upon an increase in the temperature of the air leaving said space, air conditioning means in said space, means for circulating a cooling fluid through said air conditioning means, and means for utilizing the refrigerant leaving the evaporator, when said other valve is in control of the flow of refrigerant through the evaporator, for cooling said cooling fluid.

9. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves for controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, means for rendering said thermostatic expansion valve ineffective and placing said other valve in control of the flow of refrigerant upon an increase in the temperature of the air leaving said space, air conditioning means in said space, a cooling means, means for circulating a cooling fluid through said cooling means, means for utilizing the refrigerant leaving the evaporator, when said other valve is in control of the flow of refrigerant to the evaporator, for cooling said cooling fluid, and means responsive to the temperature of the cooling fluid leaving said cooling means for controlling the amount of cooling fluid being circulated.

10. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, means for rendering said thermostatic expansion valve ineffective and placing said other valve in control of the flow of refrigerant upon an increase in the temperature of the air leaving said space, air conditioning means in said space, means for circulating a cooling fluid through said air conditioning means, means for utilizing refrigerant leaving the evaporator, when said other valve is in control thereof, for cooling said cooling fluid, said refrigeration system also including a multispeed compressor, and means for controlling the speed of the compressor so as to maintain the cooling fluid after being cooled by said refrigerant at a substantially constant temperature.

11. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves for controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, means for rendering said thermostatic expansion valve ineffective and placing said other valve in control of the flow of refrigerant upon an increase in the temperature of the air leaving said space, air conditioning means in said space, means for circulating a cooling fluid through said air conditioning means, means for utilizing the refrigerant leaving the evaporator, when said other valve is in control of the flow of refrigerant to the evaporator, for cooling said cooling fluid, said refrigeration system also including a multispeed compressor, means responsive to the temperature of the cooling fluid after being cooled by the refrigerant for controlling the speed of the compressor when said other valve is controlling the flow of refrigerant to the evaporator, and means responsive to the pressure on the suction side of the compressor for controlling the speed of the compressor when the thermostatic expansion valve is controlling the flow of refrigerant to the evaporator.

12. In an air conditioning system of the class described, an air conditioning chamber, means for circulating air through said chamber and through a space to be conditioned, a refrigeration system including an evaporator in said chamber for reducing the dew-point temperature of the air passing through said chamber, a pair of expansion valves controlling the flow of refrigerant to said evaporator, one of said valves comprising a thermostatic expansion valve arranged to maintain the refrigerant leaving the evaporator in a superheated condition, means responsive to the saturation temperature of the air leaving the evaporator in control of said other valve to maintain said temperature substantially constant when said other valve is in control of the evaporator, means for rendering said thermostatic expansion valve ineffective and placing said other valve in control of the flow of refrigerant upon an increase in the temperature of the air leaving said space, air conditioning means in said space, means for circulating a cooling fluid through said air conditioning means, means for utilizing the refrigerant leaving the evaporator, when said other valve is controlling the flow of refrigerant to the evaporator, for cooling said cooling fluid, said refrigeration system also including a multispeed compressor, means responsive to the temperature of the cooling fluid after being cooled by the refrigerant for controlling the speed of the compressor when said other valve is in control of the flow of refrigerant to the evaporator, and means responsive to the pressure on the suction side of the compressor for controlling the speed of the compressor when the thermostatic expansion valve is in control of the flow of refrigerant to the evaporator, and time delay means for delaying the placing of the compressor under the control of the suction pressure responsive means when the control of the flow of refrigerant to the evaporator is shifted from said other valve to the thermostatic expansion valve.

13. In an air conditioning system utilizing a source of partially cooled water, a space cooler, means for circulating water through the space cooler to reduce the temperature of the space, means for cooling the water before it reaches the space cooler including a refrigerating apparatus, means for circulating air through the space being conditioned, means utilizing said refrigerating apparatus for dehumidifying the air being circulated through said space, and means for utilizing the water after leaving the space cooler for precooling the air prior to being dehumidified and for reheating the air after being dehumidified and prior to entering said space.

14. In an air conditioning system utilizing a source of partially cooled water, a space cooler, means for circulating water through the space cooler to reduce the temperature of the space, means for cooling the water before it reaches the space cooler including a refrigerating apparatus, means for circulating air through the space being conditioned, means utilizing said refrigerating apparatus for dehumidifying the air being circulated through said space, and means for utilizing the water after leaving the space cooler for precooling the air prior to being dehumidified for reheating the air after being dehumidified and prior to entering said space and for reducing the temperature of the condenser of the refrigerating apparatus.

15. In an air conditioning system utilizing a source of partially cooled water, a space cooler, means for circulating water through the space cooler to reduce the temperature of the space, means for cooling the water before it reaches the space cooler including a refrigerating apparatus, means for circulating air through the space being conditioned, means utilizing said refrigerating apparatus for dehumidifying the air being circulated through said space, means for utilizing the water after leaving the space cooler for precooling the air prior to being dehumidified for reheating the air after being dehumidified and prior to entering said space, means responsive to the temperature of the space in control of the flow of water through the space cooler, and means controlling the cooling of the water by the refrigerating apparatus and the humidity of the air in the space so that the temperature of the water flowing through the space cooler will be above the dew-point temperature of the air within the space.

16. In an air conditioning system for a building having a plurality of spaces therein to be conditioned, an air conditioning chamber, means for circulating air through said chamber and through said building, means within said chamber for cooling the air below the dew-point temperature of the air entering the chamber to reduce the humidity thereof, a precooling coil upstream from said cooling means and a reheating coil downstream from said cooling means in the path of air flow, cooling means in each of the spaces to be conditioned, means for circulating a cooling fluid through said space cooling means, means for conducting the cooling fluid from the space cooling means through the reheating coil and thence through the precooling coil, and means responsive to the difference in temperature of the fluid leaving said precooling coil and the air entering said chamber for controlling the amount of cooling fluid that is circulating through the precooling and reheating coils.

17. In an air conditioning system for a building having a plurality of spaces therein to be conditioned, an air conditioning chamber, means for circulating air through said chamber and through said building, means within said chamber for cooling the air below the dew-point temperature of the air entering the chamber to reduce the humidity thereof, a precooling coil upstream from said cooling means and a reheating coil downstream from said cooling means in the path of air flow, cooling means in each of the spaces to be conditioned, means for circulating a cooling fluid through said space cooling means, means for conducting the cooling fluid from the space cooling means through the reheating coil and thence through the precooling coil, means responsive to the difference in temperature of the fluid leaving said precooling coil and the air entering said chamber for controlling the amount of cooling fluid that is circulating through the precooling and reheating coils, means responsive to a drop in temperature of the air leaving said spaces to a predetermined value for stopping the flow of cooling fluid through said cooling means and the precooling and reheating coils and admitting a heating fluid to said reheating coil, and means responsive to the temperature of the air leaving said reheating coil in control of the flow of heating fluid therethrough.

18. In an air conditioning system for a building having a plurality of spaces therein to be conditioned, an air conditioning chamber, means for circulating outdoor air through said chamber and through the spaces to be conditioned, means for tempering the outdoor air entering said air conditioning chamber, means for dehumidifying the tempered air, means for tempering the dehumidified air, space cooling means, means for circulating a cooling fluid through said space cooling means, heat dissipating means for dissipating the heat absorbed from the air by the dehumidification thereof, and means for conveying the exhausted conditioned air and the cooling fluid leaving the space cooling means to the heat dissipating means.

19. In an air conditioning system for a building having a plurality of spaces therein to be conditioned, an air conditioning chamber, means for circulating outdoor air through said chamber and through the spaces to be conditioned, means for dehumidifying the air passing through said chamber, space cooling means, means for circulating a cooling fluid through said space cooling means, means utilizing the cooling fluid leaving the space cooling means for precooling and reheating the air passing through said air conditioning chamber respectively before and after the air is dehumidified, heat dissipating means for dissipating the heat absorbed from the air by the dehumidification thereof, and means for conveying the exhausted conditioned air and the cooling fluid leaving the space cooling means to the heat dissipating means to assist in the dissipation of the heat.

20. In a system of the class described, a vertical cooling tower, a source of fluid to be cooled, coil means in said tower for said fluid so arranged as to carry said fluid back and forth across said tower and progressively downwardly in said tower, means for causing a flow of air upwardly through said tower and over said coil means, a source of cooling fluid, at least one of said fluids having a variable temperature, means for causing a spray of said cooling fluid to be admitted to said tower selectively at different levels in the tower, means responsive to the temperature of the air at said different levels, means responsive to the temperature of said source of cooling fluid, and means operated jointly by said last two means for controlling the point of admission of said spray so that the temperature thereof is substantially the same as the wet bulb temperature of the air at said point.

21. In an air conditioning system for a space, an air conditioning chamber, means for circulating air through said chamber and to the space, a refrigeration system including an evaporator located in said chamber and over which the air to be conditioned is circulated, a pair of valves in control of the flow of refrigerant through said evaporator, a thermostat responsive to the temperature of the refrigerant leaving said evaporator in control of a first of said valves to maintain the temperature of the refrigerant leaving the evaporator such that it will be in a gaseous state, means responsive to the temperature of the air after it has passed over the evaporator in control of a second of said valves and means responsive to the temperature in said space to determine whether or not said first valve shall be effective.

22. In an air conditioning system for a space, an air conditioning chamber, means for circulating air through said chamber and to the space, a refrigeration system including an evaporator located in said chamber and over which the air to be conditioned is circulated, a pair of valves in control of the flow of refrigerant through said evaporator, a thermostat responsive to the temperature of the refrigerant leaving said evaporator in control of a first of said valves to maintain the temperature of the refrigerant leaving the evaporator such that it will be in a gaseous state, means responsive to the temperature of the air after it has passed over the evaporator in control of a second of said valves whereby the refrigerant passing through said evaporator may not be entirely evaporated when controlled by said valve, means to determine whether or not said first valve shall be effective to control the flow of refrigerant through said evaporator, a cooling coil for also cooling said space, means for circulating a cooling fluid through said cooling coil, and means for utilizing any liquid refrigerant leaving the evaporator, when said second valve is in control of the flow of refrigerant through said evaporator, to cool said cooling fluid.

23. In an air conditioning system for a space, an air conditioning chamber, means for circulating air through said chamber and to the space, a refrigeration system including an evaporator located in said chamber and over which the air to be conditioned is circulated, a pair of valves in control of the flow of refrigerant through said evaporator, a thermostat responsive to the temperature of the refrigerant leaving said evaporator in control of a first of said valves to maintain the temperature of the refrigerant leaving the evaporator such that it will be in a gaseous state, means responsive to the temperature of the air after it has passed over the evaporator in control of a second of said valves whereby the refrigerant passing through said evaporator may not be entirely evaporated when controlled by said second valve, means responsive to the temperature of the air in said space to determine whether or not said first valve shall be effective to control the flow of refrigerant through said evaporator, a cooling coil for also cooling said space, means for circulating a cooling fluid through said cooling coil, and means for utilizing any liquid refrigerant leaving the evaporator, when said second valve is in control of the flow of refrigerant through said evaporator, for cooling said cooling fluid.

24. In an air conditioning system for a building having a plurality of spaces therein to be conditioned, an air conditioning chamber, means for circulating air through said chamber and through said building, means within said chamber for cooling the air below the dew-point temperature of the air entering the chamber to reduce the humidity thereof, a precooling coil upstream from said cooling means and a reheating coil downstream from said cooling means in the path of air flow, cooling means in each of the spaces to be conditioned, means for circulating a cooling fluid through said space cooling means, and means for conducting the cooling fluid from the space cooling means through the reheating coil and then through the precooling coil.

25. In an air conditioning system for a building having a plurality of spaces therein to be conditioned, an air conditioning chamber, means for circulating air through said chamber and through said building, a refrigeration system including an evaporator located within said chamber for cooling the air passing through the chamber, a precooling coil upstream from said evaporator and a reheating coil downstream from said evaporator in the path of air flow, cooling means in each of the spaces to be conditioned, means for circulating a cooling fluid through said space cooling means, means for conducting the cooling fluid from the space cooling means through the reheating coil and then through the precooling coil, and means for precooling said cooling fluid by said refrigeration system prior to its passage through said space cooling means.

ROBERT B. P. CRAWFORD.